US010225990B2

United States Patent
Monbaliu

(10) Patent No.: US 10,225,990 B2
(45) Date of Patent: Mar. 12, 2019

(54) RETRACTABLE BLOCKS IN THE DOORS OF A LARGE SQUARE BALER

(71) Applicant: CNH Industrial America LLC, New Holland, PA (US)

(72) Inventor: Sven Monbaliu, Zuienkerke (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/741,720

(22) PCT Filed: Jul. 1, 2016

(86) PCT No.: PCT/EP2016/065540
§ 371 (c)(1),
(2) Date: Jan. 3, 2018

(87) PCT Pub. No.: WO2017/005635
PCT Pub. Date: Jan. 12, 2017

(65) Prior Publication Data
US 2018/0192591 A1    Jul. 12, 2018

(30) Foreign Application Priority Data
Jul. 3, 2015  (BE) .................................. 2015/0184

(51) Int. Cl.
*A01F 15/08* (2006.01)
*A01F 15/04* (2006.01)

(52) U.S. Cl.
CPC ........ *A01F 15/0825* (2013.01); *A01F 15/042* (2013.01); *A01F 2015/048* (2013.01)

(58) Field of Classification Search
CPC .. A01F 15/0825; A01F 15/042; A01F 15/048; A01F 2015/048
USPC ............. 100/179, 187, 188 R, 189, 191, 192
See application file for complete search history.

(56) References Cited

U.S. PATENT DOCUMENTS

| 2,722,884 | A | * | 11/1955 | Seltzer | ................ A01F 15/0858 100/192 |
| 3,424,081 | A | | 1/1969 | Hoke | |
| 4,354,430 | A | | 10/1982 | Horiuchi | |
| 4,750,418 | A | * | 6/1988 | Naaktgeboren | ....... B30B 9/3025 100/192 |
| 5,123,338 | A | * | 6/1992 | Mathis | ................ A01F 15/0825 100/192 |

(Continued)

FOREIGN PATENT DOCUMENTS

| EP | 0745320 | A1 | 12/1996 | |
| EP | 2644018 | A1 | 10/2013 | |
| GB | 2034244 | A | * 6/1980 | ............. A01F 15/08 |

*Primary Examiner* — Jimmy T Nguyen
*Assistant Examiner* — Gregory Swiatocha
(74) *Attorney, Agent, or Firm* — Peter K. Zacharias; Patrick M. Sheldrake

(57) ABSTRACT

An agricultural baler has a bale chamber for the compression of crop into bales with a floor, ceiling, and two walls. A plunger forces crop into the bale chamber. An actuator system presses the ceiling and walls of the bale chamber inward. At least one retractable friction block in the ceiling or walls is used to increase the compression and density of the crop. The friction blocks extend inwards as an increasing function of either decreased pressure being exerted against the ceiling or walls by the crop being baled, or inward displacement of the ceiling or walls by the actuator system.

15 Claims, 10 Drawing Sheets

(56) References Cited

U.S. PATENT DOCUMENTS

| | | | | |
|---|---|---|---|---|
| 6,026,741 A | * | 2/2000 | Lippens | A01F 15/0825 |
| | | | | 100/191 |
| 2013/0255512 A1 | * | 10/2013 | Naeyaert | A01F 15/0825 |
| | | | | 100/191 |
| 2014/0090568 A1 | * | 4/2014 | Missotten | A01F 15/08 |
| | | | | 100/346 |

* cited by examiner

RETRACTABLE BLOCKS IN THE DOORS OF A LARGE SQUARE BALER

BACKGROUND OF THE INVENTION

The present invention relates to agricultural balers, and, more particularly, to an agricultural baler with retractable friction blocks in the ceiling and walls of the bale chamber.

Agricultural balers are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc. A packer unit is used to move the crop material from the pickup unit to a duct or pre-compression chamber. The packer unit forms a wad of crop within the pre-compression chamber which is then transferred to a main bale chamber. For purposes of discussion, the charge of crop material within the pre-compression chamber will be termed a "wad", and the charge of crop material after being compressed within the main bale chamber will be termed a "flake". Typically such a packer unit includes packer tines or forks to move the crop material from the pickup unit into the pre-compression chamber. Instead of a packer unit it is also known to use a rotor cutter unit which may chop the crop material into smaller pieces.

A stuffer unit transfers the wad of crop material in charges from the pre-compression chamber to the main bale chamber. Typically such a stuffer unit includes stuffer forks which are used to move the wad of crop material from the pre-compression chamber to the main bale chamber, in sequence with the reciprocating action of a plunger within the main bale chamber. In the main bale chamber, after the wad is injected into the bale chamber, the plunger compresses the wad of crop material into a flake against previously formed flakes to form a bale and, at the same time, gradually advances the bale toward the outlet end of the bale chamber.

The bale chamber typically has three moving walls, being the top and two sides, which may be positioned by two hydraulically controlled actuators connected to a positioning mechanism. Pressure exerted by the walls of the bale chamber dictates the frictional force required to overcome static friction and shift the flakes in the chamber. An increased force to shift the flakes causes the plunger to compact the flakes tighter, to thereby produce a higher density bale.

When enough flakes have been added and the bale reaches a full or other predetermined size, a number of knotters are actuated which wrap and tie twine, cord or the like around the bale while it is still in the main bale chamber. The twine is cut and the formed baled is ejected out the back of the baler as a new bale is formed.

Under normal conditions, this arrangement works well, as the friction force of the ceiling and walls against the bale being compressed provides the back pressure necessary to achieve the desired density of crop material in the bale. However, under difficult baling conditions, insufficient back pressure may be present near the inlet end of the bale chamber nearest the plunger. As a result, the crop material may re-expand toward the plunger after the plunger has compressed it. Additionally, the ceiling may be pressed too low by the hydraulically controlled actuators, resulting in a poor bale shape, and binder twine snapping due to re-expansion of the crop material due to insufficient compression after the bale leaves the large square baler. Similarly, one or both of the walls may be pressed too far inward by the hydraulically controlled actuators, with similar results.

What is needed in the art is a way to increase the back pressure on the bale being formed and compressed near the inlet end of the bale chamber nearest the plunger, in order to cause the bale to fill the entire cross section of the bale chamber, and to achieve greater compression and higher density of the crop material.

SUMMARY OF THE INVENTION

The present invention provides such a way to increase the back pressure on the bale being formed and compressed near the inlet end of the bale chamber nearest the plunger.

The invention in one form is directed to an agricultural baler having a bale chamber for the compression of crop material into bales. The bale chamber has a floor, a ceiling, and two walls. A plunger adjoins the bale chamber, and forces crop material into it. An actuator system presses the ceiling and the two walls of the bale chamber inward against the crop material being baled. At least one retractable friction block is located in the ceiling and/or in one or both of the walls, and is used to increase the compression and density of the crop material at the inlet end of the bale chamber. The at least one retractable friction block is operable to extend inwards as an increasing function of the inward displacement of the ceiling or walls by the actuator system.

An advantage of the present invention is that it results in higher compression of the agricultural crop material in the bale, resulting in greater bale density. Another advantage of the present invention is that it minimizes binder twine failure that often happens when an insufficiently compressed and poorly formed bale re-expands after the bale leaves the large square baler.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

DETAILED DESCRIPTION OF THE INVENTION

Figure 1:
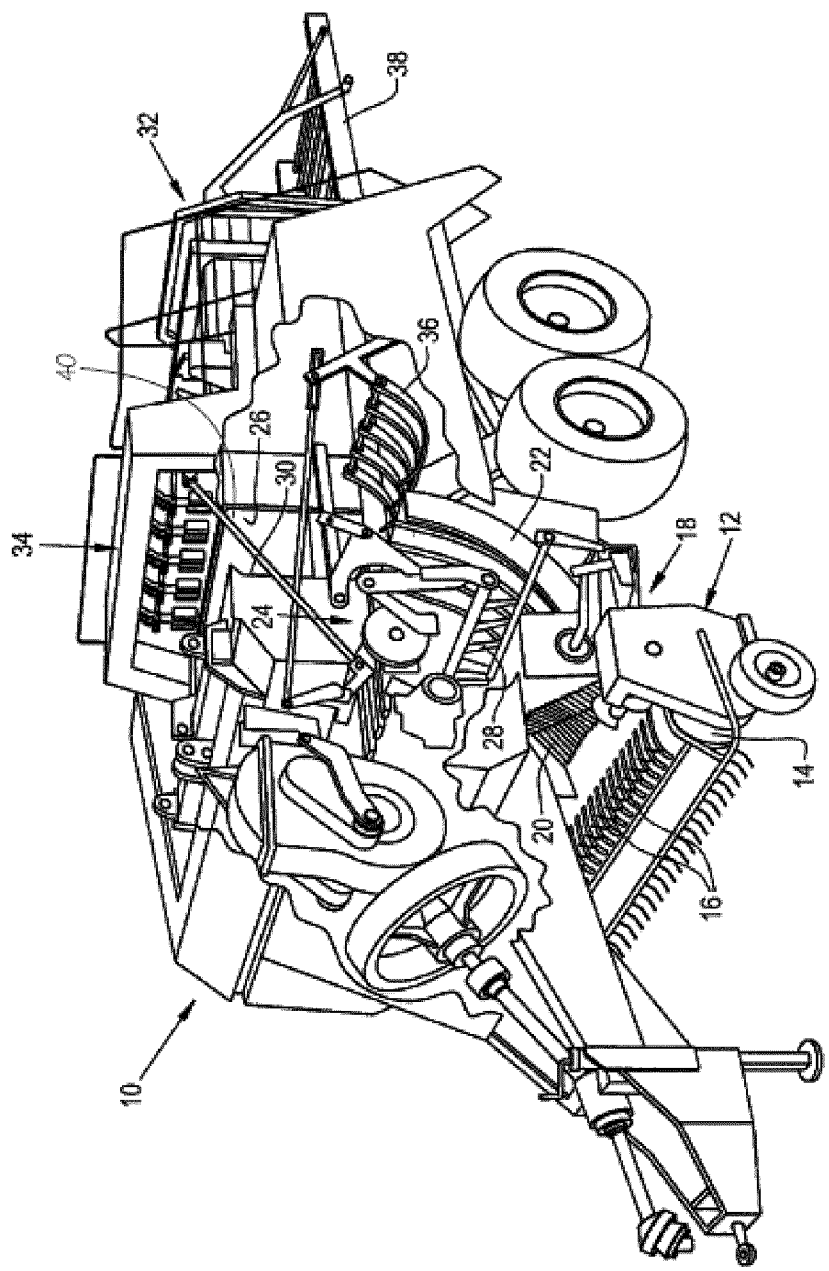
FIG. 1 is a perspective cutaway view showing the internal workings of a large square baler having a bale chamber.

Referring now to the drawings, and more particularly to FIG. 1, there is shown an agricultural harvester in the form of a large square baler 10. FIG. 1 is a perspective cutaway view showing the internal workings of the large square baler 10. The large square baler 10 operates on a two stage feeding system. Crop material is lifted from windrows into the large square baler 10 using a pickup unit 12. The pickup unit 12 includes a rotating pickup roll 14 with tines 16 which move the crop rearward toward a packer unit 18. An optional pair of stub augers (one of which is shown, but not numbered) are positioned above the rotating pickup roll 14 to move the crop material laterally inward. The packer unit 18 includes packer tines 20 which push the crop into a pre-compression chamber 22 to form a wad of crop material. The packer tines 20 intertwine the crop together and pack the crop within pre-compression chamber 22. The pre-compression chamber 22 and the packer tines 20 function as the first stage for crop compression.

Once the pressure in the pre-compression chamber 22 reaches a predetermined sensed value, a stuffer unit 24 moves the wad of crop from the pre-compression chamber 22 to a bale chamber 26. The stuffer unit 24 includes stuffer forks 28 which thrust the wad of crop directly in front of a plunger 30, which reciprocates within the bale chamber 26 and compresses the wad of crop into a flake. The stuffer forks 28 return to their original stationary state after the wad of material has been moved into the bale chamber 26. The plunger 30 compresses the wads of crop into flakes to form a bale and, at the same time, gradually advances the bale toward an outlet end 32 of the bale chamber 26. The bale chamber 26 and plunger 30 function as the second stage for crop compression. When enough flakes have been added and the bale reaches a full (or other predetermined) size, the knotters 34 are actuated which wrap and tie twine around the bale while it is still in the bale chamber 26. Needles 36 bring the lower twine up to the knotters 34 and the tying process then takes place. The twine is cut and the formed baled is ejected from a discharge chute 38 as a new bale is formed.

Figure 2:
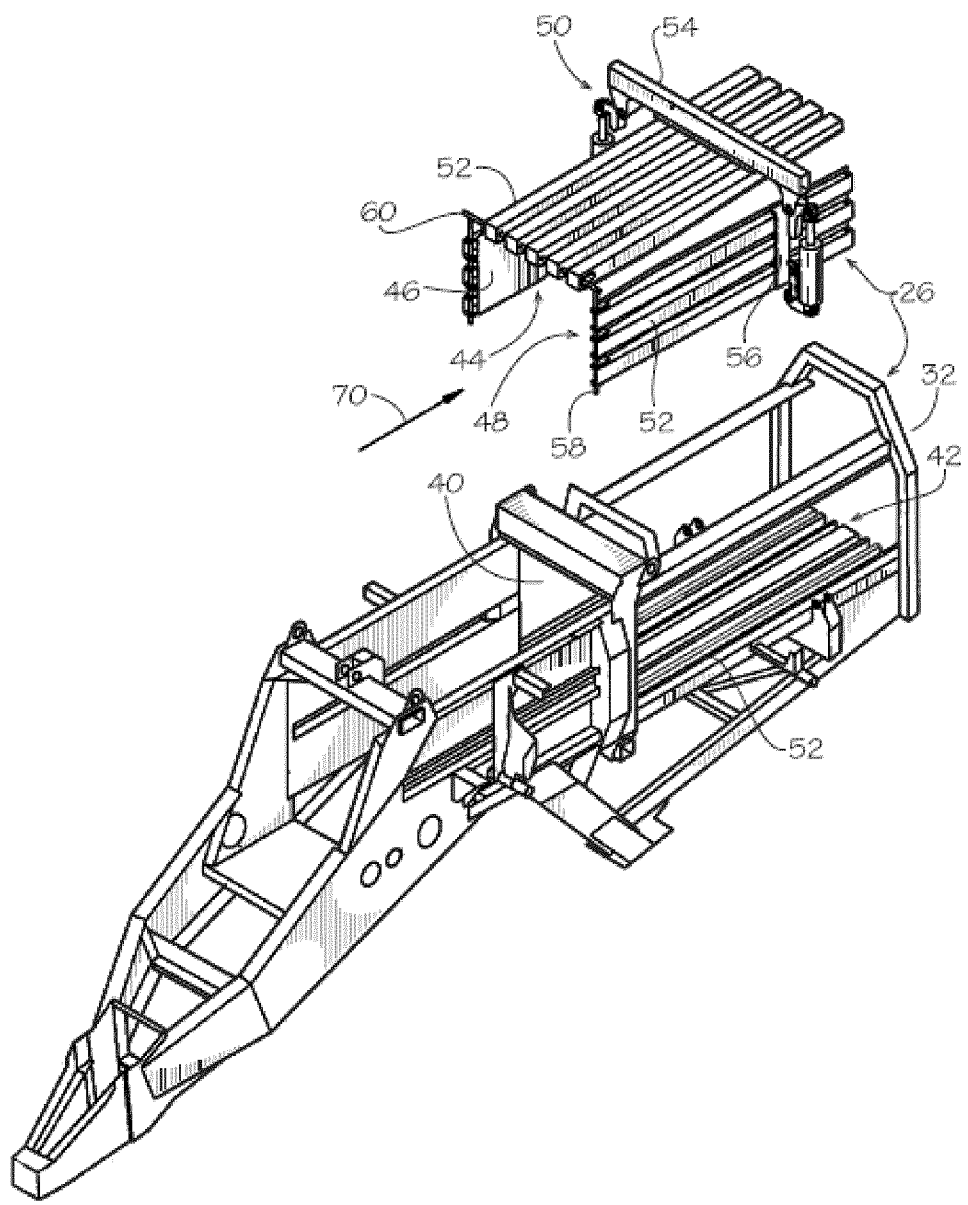
FIG. 2 is a partially exploded view illustrating the bale chamber of FIG. 1.

Referring now to FIG. 2 certain framework of the large square baler 10 is revealed with the bale chamber 26 illustrated in an exploded view. Bale chamber 26 is defined by a floor 42, a ceiling 44 and walls 46, 48. Ceiling 44 of bale chamber 26 is sometimes referred to in the art as the "top door," and walls 46, 48 are sometimes referred to in the art as "side doors." However, for the purposes of clarity in the present application, the terms "ceiling" and "walls" will be used, though it be understood that the respective terms are interchangeable. For purposes of discussion floor 42 will be considered fixed relative to the framework, and the ceiling 44 and walls 46, 48 are movable by the action of a density ring actuator system 50. The bale chamber 26 has a cross-section that is variable as determined by the density ring actuator system 50. The ceiling 44 and the walls 46, 48 are shown in FIG. 2 as being expanded out creating an outward taper allowing a bale to easily pass through the bale chamber 26. Under normal use the bale chamber 26 is positioned by the density ring actuator system 50 to be tapered inwardly leading to a reduced cross section as the bale moves through the bale chamber 26. Controlling the cross section of the bale chamber 26 results in control of the density of the bale that is formed in the bale chamber 26, since a more inwardly tapered configuration increases the restriction of travel of the bale.

The floor 42, ceiling 44 and walls 46, 48 each have at least one structural member 52 extending along a bale forming direction 70. The structural members 52 contain the bale and serve to restrict the movement of the bale as it travels through the bale chamber 26. Each of the structural members 52 has a compression zone 64 where the inner surface tapers inwards toward the bale chamber 26, and a holding zone 68 where the inner surface tapers outward away from the bale chamber 26. In practice, the density ring actuator system 50 holds the ceiling 44 and walls 46, 48 at a slight inward angle, so that the inward taper of the compression zone 64 becomes somewhat more pronounced, and the outward taper of the holding zone 68 becomes more or less in parallel with the bale forming direction 70.

The plunger 30, also referred to as a compressing device 30 is not shown in FIG. 2 for the purpose of clarity. The plunger 30 pushes the wad against the previously formed flakes causing a movement of the forming bale in the bale forming direction 70. This compression of the crop material in the bale, particularly in the compression zone 64, results in a force that is conveyed by way of the crop material to the structural members 52. When the plunger 30 retracts there is some rebound of portions of the bale and the now reduced force on the bale is also felt by the structural members 52. The structural members 52 are held by support members, here illustrated as the support members 54 and 60 holding the structural members 52 associated with the ceiling 44 and the support members 56 and 58 holding the structural members 52 associated with the wall 48. In a like manner the structural members 52 associated with the wall 46 are also constrained.

Figure 3:
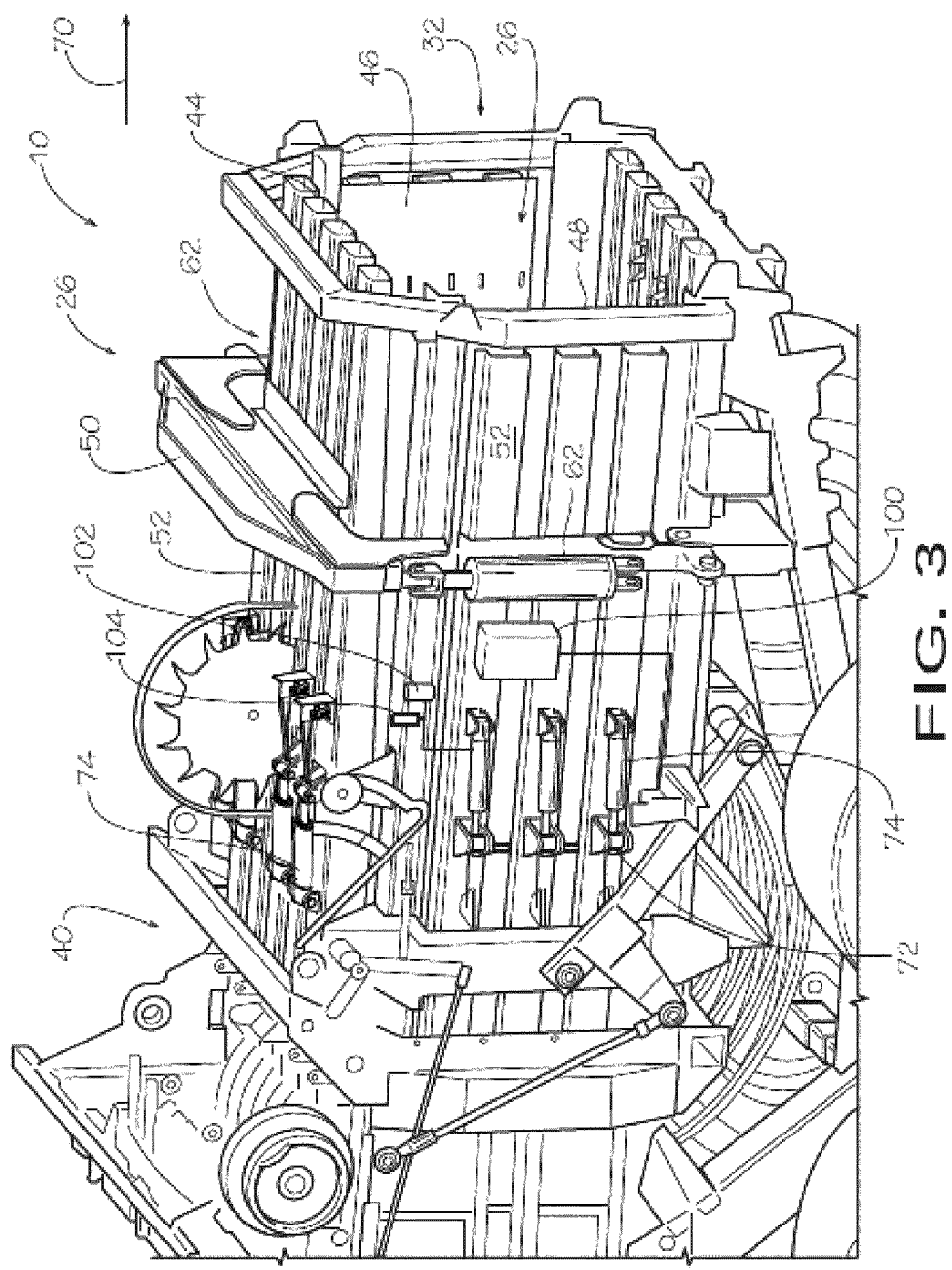
FIG. 3 is a perspective view of the bale chamber of a large square baler according to a representative embodiment of the invention.
Figure 4:
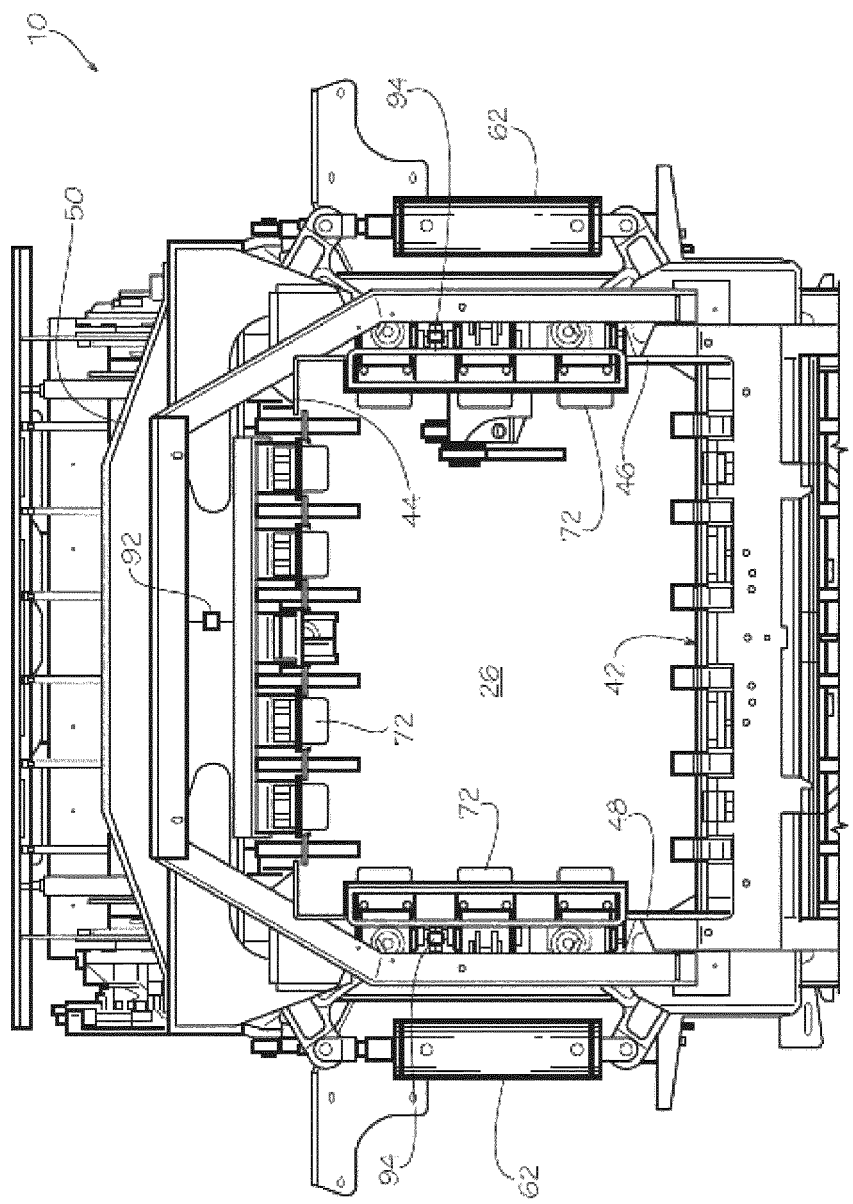
FIG. 4 is an end view of the bale chamber of a large square baler according to a representative embodiment of the invention.
Figure 5:
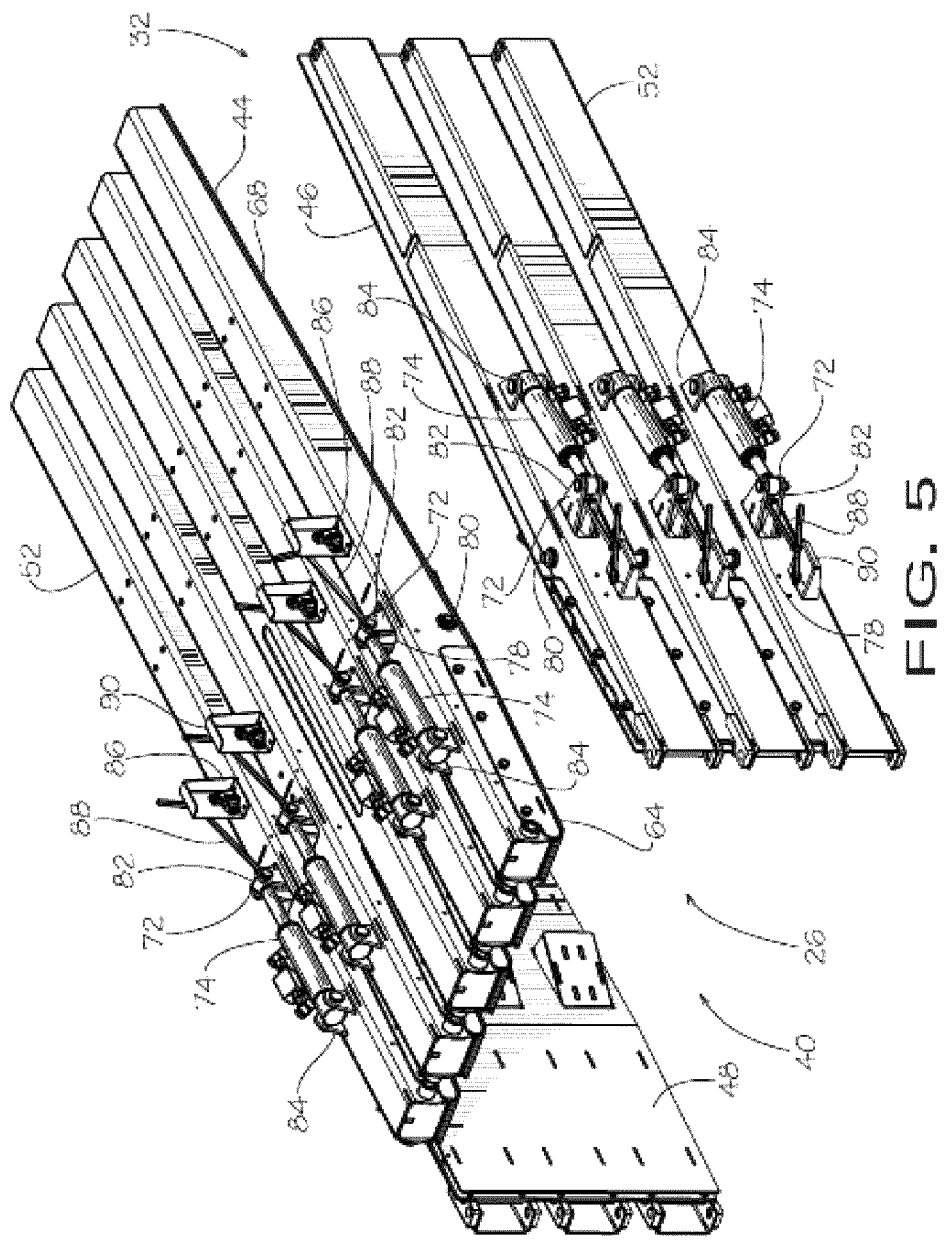
FIG. 5 is a perspective view of the ceiling and walls of a large square baler having retractable friction blocks according to a representative embodiment of the invention.

Turning now to FIGS. 3 and 4, the workings of the bale chamber 26 of the large square baler 10 are shown in further detail. As can be seen, the density ring actuator system 50 is actuated by at least one density ring hydraulic cylinder 62, shown in FIG. 3 as two such density ring hydraulic cylinders 62, positioned on each wall 46, 48. The density ring actuator system 50 presses inward on the structural members 52 of each of the ceiling 44 and walls 46, 48. These pivot inward about support members 58 and 60 (see FIG. 2) at the inlet end 40 of the bale chamber 26 nearest the plunger 30 (see FIG. 1). This inward force produced by the density ring actuator system 50 produces a friction force of the ceiling 44 and walls 46, 48 against the bale being compressed as flakes are added to it and as the plunger 30 pushes it through the bale chamber 26.

Under normal conditions, this arrangement works well, as the friction force of the ceiling 44 and walls 46, 48 against the bale being compressed, particularly in the compression zone 64, provides the back pressure necessary to achieve the desired density of crop material in the bale. However, under difficult baling conditions, insufficient back pressure may be present in the compression zone 64 near the inlet end 40 of the bale chamber 26 nearest the plunger 30. As a result, the crop material may re-expand toward the plunger 30 after the plunger has compressed it. Additionally, the ceiling 44 may be pressed too low by the density ring actuator system 50, resulting in a poor bale shape, and binder twine snapping due to re-expansion of the crop material due to insufficient compression during forming of the bale when the bale leaves the large square baler 10. Similarly, one or both of the walls 46, 48 may be pressed too far inward by the density ring actuator system 50, with similar results.

The problem is due to the fact that the angle between the compression zone 64 and the holding zone 68 is too small for some conditions. In good conditions with a good top fill of crop material, the inner surface of the ceiling 44 in the holding zone 68 will generally lie parallel with the floor 42 in the bale forming direction 70. Because the top fill of crop material is good, sufficient force is applied to the crop material being formed into a bale in the compression zone 64 near the inlet end 40 of the bale chamber 26 nearest the plunger 30. However, when the top fill of crop material is insufficient, then the amount of force that can be applied to the crop material in the compression zone 64 also becomes insufficient for the proper compression and formation of the bale.

Under difficult baling conditions, it is advantageous if the angle of inward taper of each of the ceiling 44 and walls 46, 48 is increased in order to accomplish earlier contact with the crop and to increase the compression and back pressure to ensure proper bale formation. However, the ceiling 44 and walls 46, 48 are connected with each other so that using the density ring actuator system 50 to increase the inward taper at the compression zone 64 also increases the force and decreases the cross section, particularly the ceiling 44 height, in the holding zone 68 near the outlet end 32.

The inventors have found that by increasing the back pressure on the bale being formed and compressed near the inlet end 40 of the bale chamber 26 nearest the plunger 30, greater compression and higher density is achieved, so that the bale fills the entire cross section of the bale chamber 26. As a result, the ceiling 44 and walls 46, 48 under pressure created by the density ring actuator system 50, can create appropriate resistance.

Figure 6:
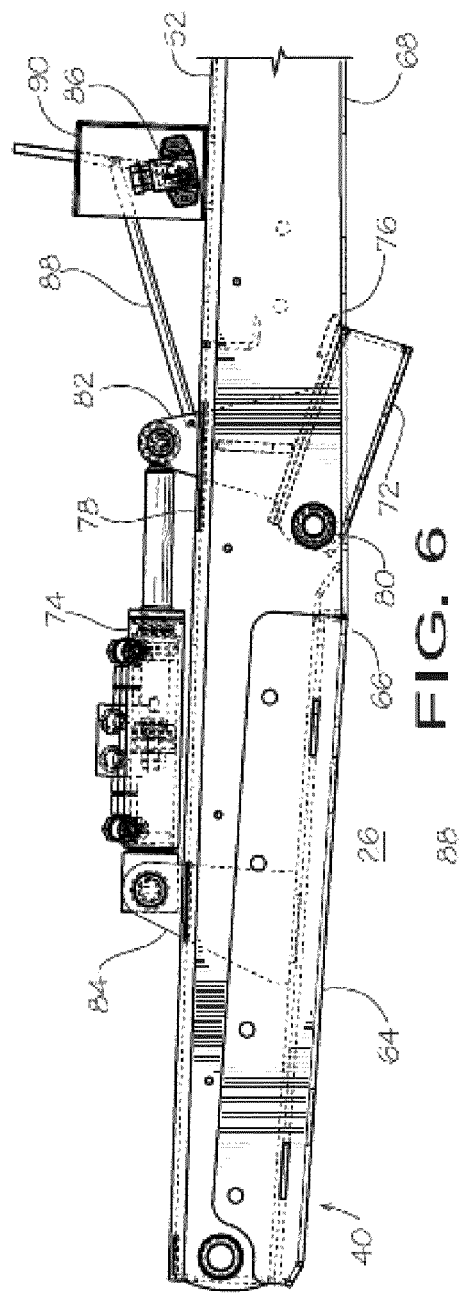
FIG. 6 is a side view of the ceiling of a large square baler having retractable friction blocks according to a representative embodiment of the invention.
Figure 7:
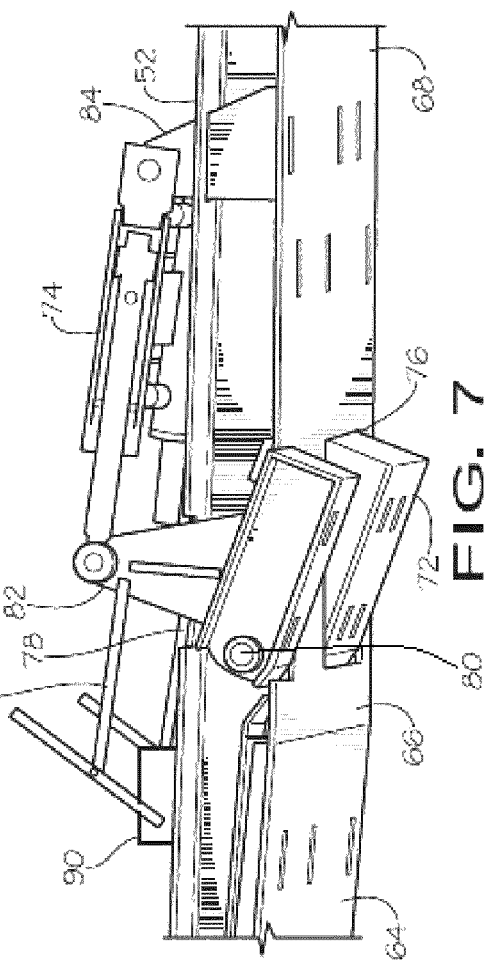
FIG. 7 is a perspective view of retractable friction blocks according to a representative embodiment of the invention.
Figure 8:
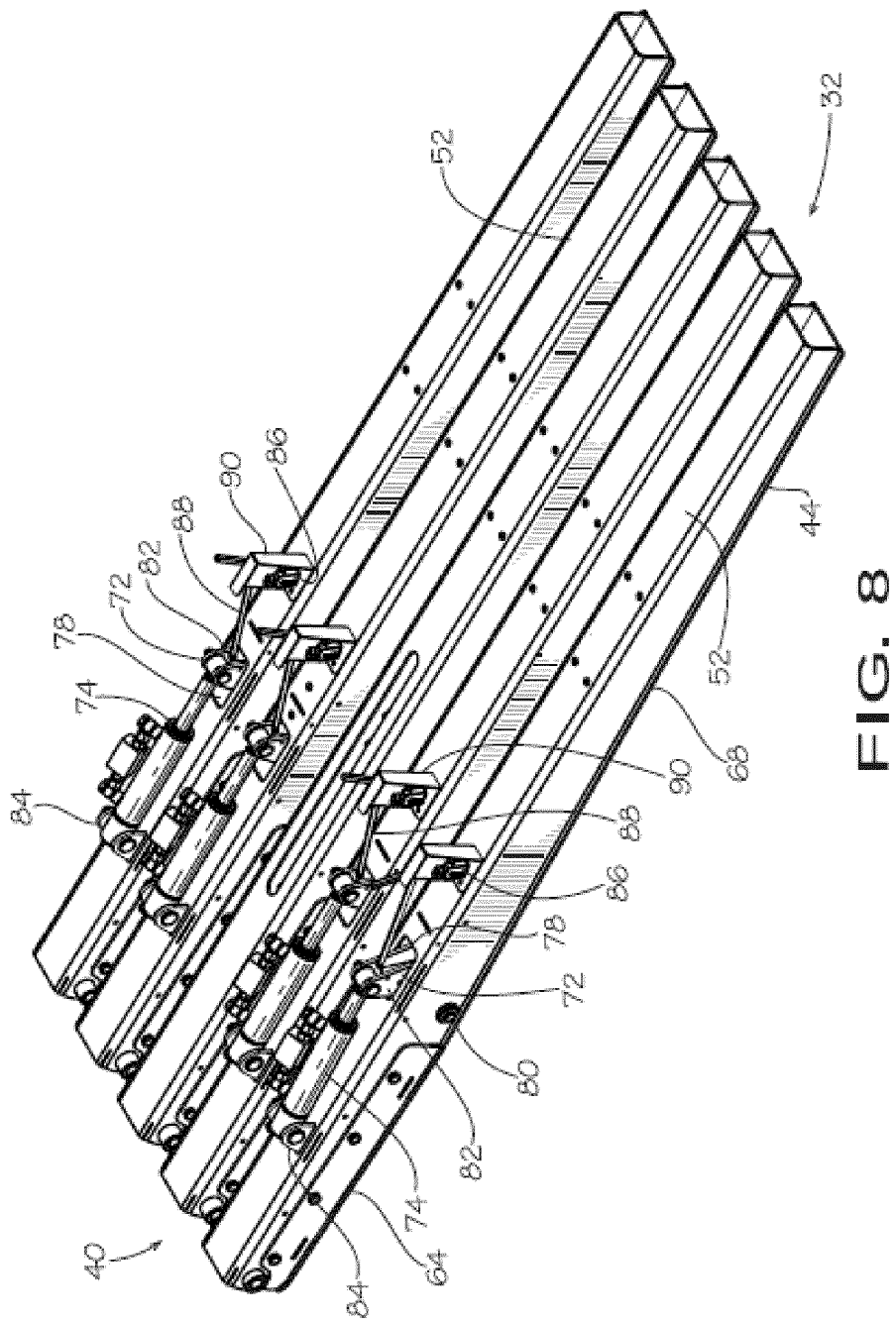
FIG. 8 is a perspective view of the ceiling of a large square baler having retractable friction blocks according to a representative embodiment of the invention.
Figure 9:
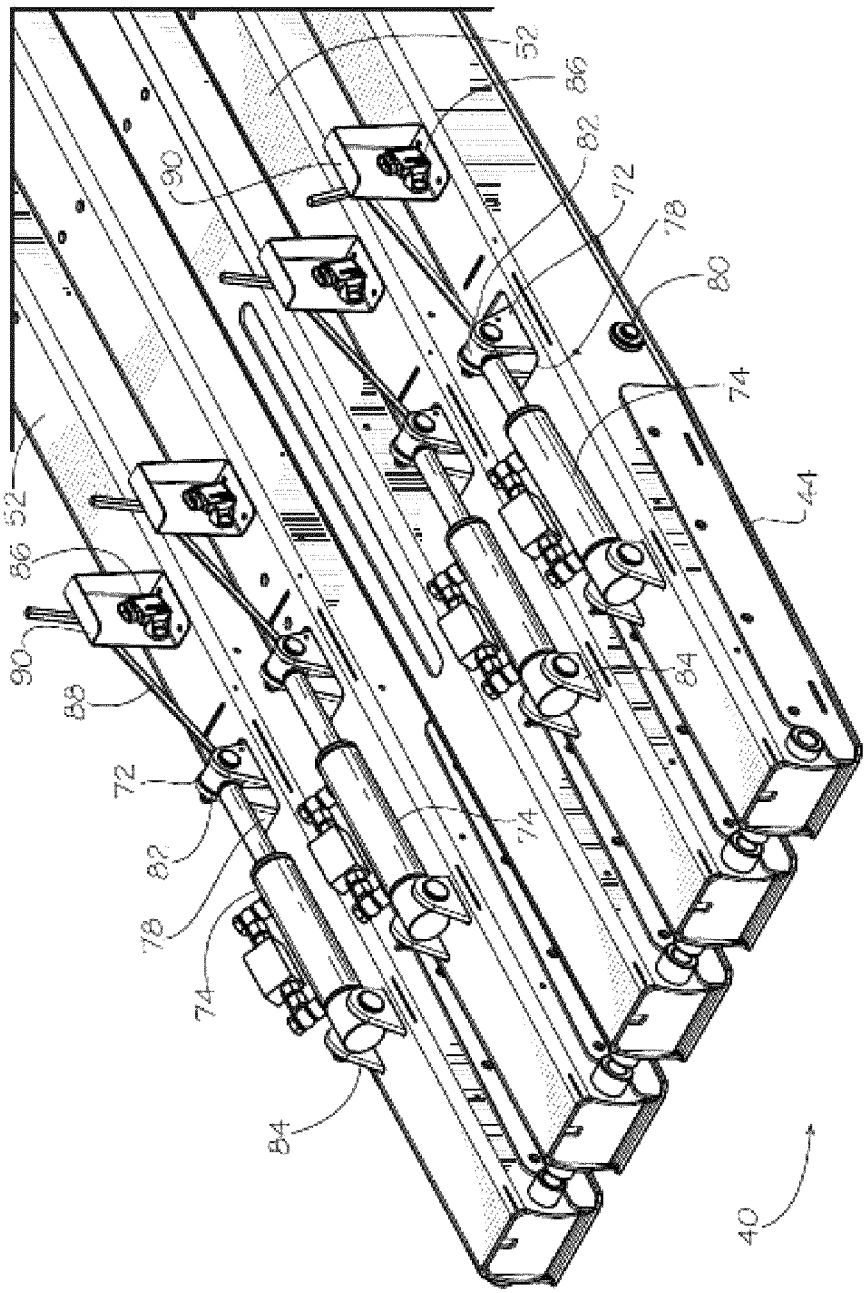
FIG. 9 is another perspective view of the ceiling of a large square baler having retractable friction blocks according to a representative embodiment of the invention.
Figure 10:
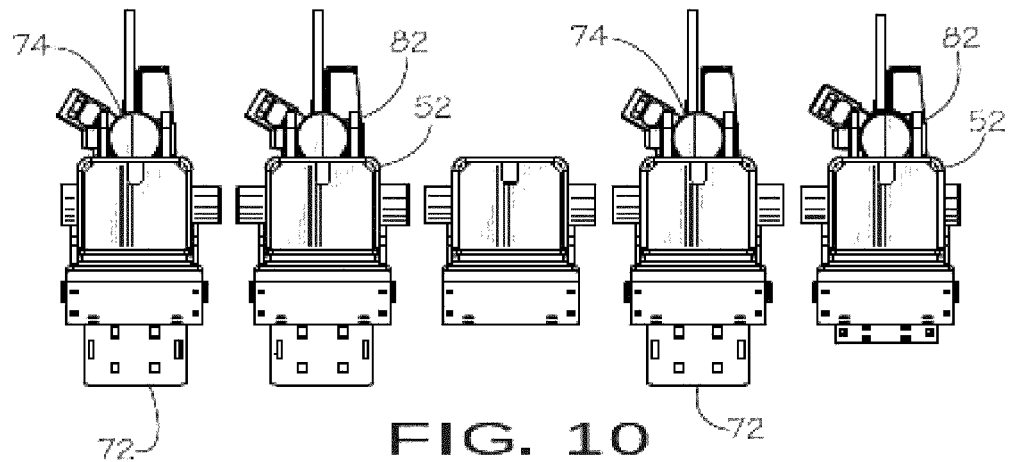
FIG. 10 is an end view of the ceiling of a large square baler having retractable friction blocks according to a representative embodiment of the invention.
Figure 11:
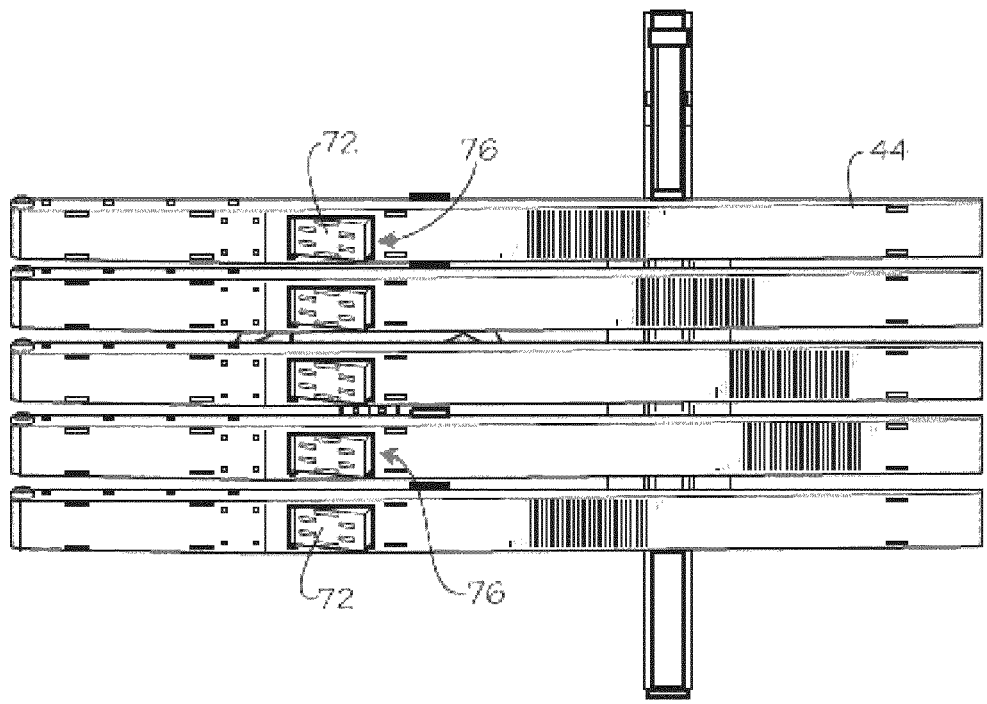
FIG. 11 is a bottom view of the ceiling of a large square baler having retractable friction blocks according to a representative embodiment of the invention.
Figure 12:
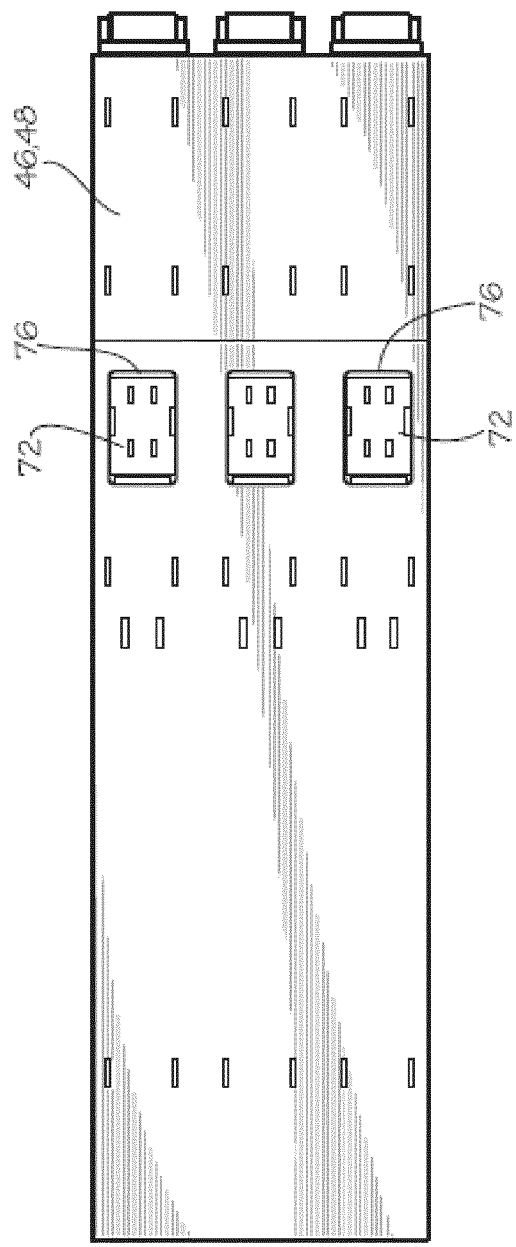
FIG. 12 is an interior view of a wall of a large square baler having retractable friction blocks according to a representative embodiment of the invention. Corresponding reference characters indicate corresponding parts throughout the several views. The exemplifications set out herein illustrate embodiments of the invention and such exemplifications are not to be construed as limiting the scope of the invention in any manner.

In order to accomplish this, retractable friction blocks 72 are provided extending through structural members 52 of ceiling 44 and/or walls 46, 48, after a bend 66 (see FIG. 6) marking a transition between the compression zone 64 of the bale chamber 26 and the holding zone 68 of the bale chamber 26. Each of the retractable friction blocks 72 are actuated by retractable block hydraulic cylinders 74. The retractable friction blocks 72 pivot in such a way as to create a restriction against the passage of crop material as it is being compressed, and to function as a pawl preventing backward movement of the crop material upon withdrawal of the plunger 30. Further, the reaction force of the retractable friction blocks 72 against the crop material help hold the ceiling 44 and walls 46, 48 in a normal position, i.e.—not excessively downward or inward as might otherwise be the case under some baling conditions or crop material conditions. When using the retractable friction blocks 72, the blocks will push on the flakes in the baling chamber 26 and will, as a reaction to this force, push the ceiling 44 and/or the walls 46, 48 outwards thus bringing it back to a normal position. That way, the necessary pressure created by the density ring actuator system 50 can still be applied, but is transferred to the crop via the friction blocks 72. The position of the retractable friction blocks 72 after the bend 66 is preferred since at this position, the amount of force applied to the flakes will have the most impact on the repositioning of the ceiling 44 and/or the walls 46, 48. A control system 100 is connected to the retractable block hydraulic cylinders 74, which may be electrical, electronic, hydraulic, or a combination thereof. For simplicity of illustration, the control system 100 shown in FIG. 3 is shown connected to a cylinder of the wall 48, but it is understood that the control system 100 is connected to each of the cylinders of each of the retractable block hydraulic cylinders 74. The control system 100 is operable to extend the retractable friction blocks 72 if the crop material baling conditions tend to cause the crop material not to fill the entire cross section of the bale chamber 26 or if insufficient compression and density occurs. The control system 100 may be operable to extend all retractable friction blocks 72 together, or more preferably, may be operable to extend a subset of the retractable friction blocks 72, such as those in the ceiling 44 or in one or both of the walls 46, 48 or even some of the friction blocks 72 in the ceiling 44 and/or in one or both of walls 46, 48.

More specifically, if the crop material is tending not to fill the bale chamber 26 to the ceiling 44, or is tending to achieve insufficient density at its upper side, the ceiling 44 will tend to drop too low under pressure from the density ring actuator system 50. The control system 100 senses this, by way of position sensors 92, and extends the upper retractable friction blocks 72. This results in the ceiling 44 being pushed upwards by the reaction force from the upper retractable friction blocks 72, and results in better bale formation and desired crop material density along the upper side of the bale. It also allows the bale to form to its full cross section so that the ceiling 44 under pressure created by the density ring actuator system 50 can again create the appropriate resistance, resulting in the desired back pressure.

Similarly, if the crop material is tending not to fill the bale chamber 26 to one of the walls 46, 48, or is tending to achieve insufficient density at that side, the respective wall 46, 48 will tend to move too far inward under pressure from the density ring actuator system 50. The control system 100 again senses this, by way of position sensors 94, and extends the retractable friction blocks 72 in that wall 46, 48. This again results in the respective wall 46, 48 being pushed outward by the reaction force from the retractable friction blocks 72, and results in better bale formation and desired crop material density along that side of the bale. It also allows the bale to form to its full cross section so that the respective wall 46, 48 under pressure created by the density ring actuator system 50 can again create the appropriate resistance.

Therefore, it can be seen that the control system 100 may link the pressure in the retractable block hydraulic cylinders 74 to the downward or inward position of the respective ceiling 44 or wall 46, 48. In other words, the control system 100 may respond to an excessively downward or inward position of the respective ceiling 44 or wall 46, 48, by increasing the pressure in the corresponding retractable block hydraulic cylinders 74. Alternately, the control system 100 may respond to a lack of pressure being exerted by the bale against the respective ceiling 44 or wall 46, 48, by increasing the pressure in the corresponding retractable block hydraulic cylinders 74.

This may be accomplished by having at least two different working pressures in the corresponding sets of retractable block hydraulic cylinders 74, one for the ceiling 44, and another for the walls 46, 48. Alternately, it may be accomplished by having three different working pressures in the corresponding sets of retractable block hydraulic cylinders 74, one for the ceiling 44, another for one wall 46, and a third for the other wall 48. Again, this may be done by the control system 100 entirely hydraulically, or by a combination of electrical, electronic, and/or hydraulic controls connected to the retractable block hydraulic cylinders 74. Alternately, each retractable block hydraulic cylinder 74 may have an individual working pressure to allow individual controlling of the blocks 74.

The retractable block hydraulic cylinders 74, or the hydraulic controls connected thereto, may be provided with one or more hydraulic accumulators 102 and/or pressure relief valves 104. In this way, the hydraulic accumulator 102 can compensate for the plunger 30 striking the bale by allowing the retractable friction blocks 72 to retract somewhat, thereby limiting the forces experienced by the retractable friction blocks 72, plunger 30, and other components of the large square baler 10. Similarly, the pressure relief valves 104 can relieve such excess pressure, should it occur.

Turning now to FIGS. 5 through 12, the workings of retractable friction blocks 72 are shown in greater detail. Each retractable friction block 72 pivots on a retractable block pivot 80 and is provided with a lever arm 82. The retractable friction block 72 is either flush with the interior surface of the ceiling 44 or wall 46, 48, or extends into the bale chamber 26, depending on the position of the retractable block hydraulic cylinder 74 acting through lever arm 82. Note that some of the retractable friction blocks 72 are rotated inward upon extension of the retractable block hydraulic cylinders 74, for example those located on the ceiling 44, while some of the retractable friction blocks 72 are rotated inward upon contraction of the retractable block hydraulic cylinders 74, for example those located on the walls 46, 48. However, any combination of push and pull arrangements is contemplated, according to convenience. The retractable friction block 72 sits in a recess 76 in inside of the structural member 52, and the lever arm 82 protrudes through a slot 78 in the opposite side of structural member 52. The retractable block hydraulic cylinder 74 is further attached to a cylinder mounting bracket 84. The retractable friction block 72 is generally located nearer the bend 66 of the bale chamber 26 than to the outlet end 32 of bale chamber 26, the bend 66 marking a transition between the compression zone 64 of the bale chamber 26 and the holding zone 68 of the bale chamber 26.

Each of the retractable friction blocks 72 may be provided with a sensor providing the control system 100 with information on its position. This may be a position sensor internal to the retractable block hydraulic cylinder 74 (not shown). As an alternate example, it may be an angle sensor 86 which is connected to the retractable friction block 72 through an angle sensor linkage 88 connected to the lever arm 82. The angle sensor 86 is mounted to an angle sensor bracket 90 and may be connected to the control system 100 (not shown in FIGS. 5 through 12). In this way, information regarding the position of each retractable friction block 72, alone or in combination with information regarding the pressure in the retractable block hydraulic cylinders 74, information regarding the downward or inward position of the respective ceiling 44 or wall 46, 48, and/or information regarding the pressure in density ring hydraulic cylinders 62 (not shown in FIGS. 5 through 12), may be utilized by the control system 100 in controlling the retractable friction blocks 72 and/or the density ring hydraulic cylinders 62.

While this invention has been described with respect to at least one embodiment, the present invention can be further modified to include other embodiments, such as types of actuators other than hydraulic, for example pneumatic or electric. Another such alternative embodiment may include the use of a manual device such as a rod, the length of which is adjustable by the user, in lieu of hydraulic cylinders to control the retractable block hydraulic cylinders. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An agricultural baler, comprising:
    a bale chamber for compressing crop material into bales, the bale chamber having an inlet end, a floor, a ceiling, and two walls;
    a plunger adjoining the bale chamber for forcing the crop material into the bale chamber;
    an actuator system operable to press the ceiling and the two walls inward against the crop material being baled;
    at least one retractable friction block located in the ceiling or one of the two walls for increasing compression and density of the crop material at the inlet end of the bale chamber, the at least one retractable friction block being operable to extend inwards to increase an inward pressure resulting from inward displacement of the ceiling or walls by the actuator system; and
    a controller operatively coupled to the actuator system, the controller being configured to determine the inward displacement of the ceiling or the two walls, and to increase an inward pressure or an inward rotation of the at least one retractable friction block on a basis of the inward displacement of the ceiling or the two walls.

2. The agricultural baler of claim 1, wherein the ceiling or the two walls have a compression zone and a holding zone with a bend therebetween, the at least one retractable friction block being located in the holding zone of the ceiling or the two walls.

3. The agricultural baler of claim 2, wherein the at least one retractable friction block is located in the holding zone closer to the bend of the ceiling or the two walls of the bale chamber than to an outlet end of the bale chamber.

4. The agricultural baler of claim 1, wherein the at least one retractable friction block is actuated by a fluid actuator.

5. The agricultural baler of claim 1, wherein the at least one retractable friction block is actuated by a hydraulic cylinder.

6. The agricultural baler of claim 1, wherein the at least one retractable friction block is controlled by a control system.

7. The agricultural baler of claim 6, wherein the control system is one of entirely hydraulic and a combination of electrical and hydraulic.

8. The agricultural baler of claim 1, wherein the at least one retractable friction block is located in the ceiling of the bale chamber, and wherein the agricultural baler further comprises:

at least one retractable friction block located in a first of the two walls of the bale chamber; and at least one retractable friction block located in a second of the two walls of the bale chamber.

9. The agricultural baler of claim 8, wherein:

at least two of the retractable friction blocks of the bale chamber are operable to extend and retract together.

10. The agricultural baler of claim 8, wherein all of the friction blocks are operable to extend and retract individually.

11. The agricultural baler of claim 8, wherein:

all of the retractable friction blocks are actuated by respective hydraulic cylinders, two different working pressures are applied to the hydraulic cylinders, one of the two working pressures being applied to the hydraulic cylinder actuating the at least one retractable friction block located in the ceiling of the bale chamber, and another of the two working pressures being applied to the hydraulic cylinder actuating the retractable friction blocks located in the walls of the bale chamber, and each of the working pressures being operable to increase upon the inward displacement of the ceiling or walls by the actuator system.

12. The agricultural baler of claim 8, wherein:

all of the retractable friction blocks are actuated by respective hydraulic cylinders, three different working pressures are applied to the hydraulic cylinders, one of the three working pressures being applied to the hydraulic cylinder actuating the at least one retractable friction block located in the ceiling of the bale chamber, another of the three working pressures being applied to the hydraulic cylinder actuating the at least one retractable friction block located in the first wall of the bale chamber, and yet another of the three working pressures being applied to the hydraulic cylinder actuating the at least one retractable friction block located in the second wall of the bale chamber, and each of the working pressures being operable to increase upon the inward displacement of the ceiling or walls by the actuator system.

13. The agricultural baler of claim 1, wherein the at least one retractable friction block is further provided with at least one of a pressure accumulator and a pressure relief device, for compensating for the plunger striking the bale by allowing the at least one retractable friction block to retract in order to limit forces against the at least one retractable friction block.

14. The agricultural baler of claim 1, wherein the at least one retractable friction block is further provided with a position sensor.

15. A method of operating an agricultural baler, the agricultural bailer having a bale chamber and a plunger, the bale chamber having an inlet end, a floor, a ceiling, and two walls, the plunger adjoining the bale chamber for forcing the crop material into the bale chamber, the method comprising the steps of: inwardly displacing the ceiling or the two walls of the bale chamber determining the inward displacement of the ceiling or the two walls; and increasing an inward pressure or an inward rotation of at least one retractable friction block on a basis of the inward displacement of the ceiling or the two walls, the at least one retractable friction block being located in the ceiling or either of the two walls for increasing compression and density of the crop material at the inlet of the bale chamber, the at least one retractable friction block being operable to extend inwards to increase an inward pressure resulting from inward displacement of the ceiling or walls.

* * * * *